US010033818B2

(12) United States Patent
Thorpe et al.

(10) Patent No.: US 10,033,818 B2
(45) Date of Patent: Jul. 24, 2018

(54) USING LISTEN RANGES TO DELIVER CONTENT TO ELECTRONIC DEVICES FROM LOCAL CACHING SERVERS (71) Applicant: Apple Inc., Cupertino, CA (US)

(72) Inventors: Jason R. Thorpe, San Francisco, CA (US); Michael J. Abbott, Woodbury, MN (US); Gregory B. Vaughan, Santa Cruz, CA (US); Gregory Burns, Los Altos, CA (US); Kazuhisa Yanagihara, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 362 days.

(21) Appl. No.: 14/586,479

(22) Filed: Dec. 30, 2014

(65) Prior Publication Data

US 2015/0350342 A1 Dec. 3, 2015

Related U.S. Application Data (60) Provisional application No. 62/005,215, filed on May 30, 2014.

(51) Int. Cl.
*G06F 15/16* (2006.01)
*H04L 29/08* (2006.01)
*H04L 29/06* (2006.01)
*H04L 12/24* (2006.01)

(52) U.S. Cl.
CPC .......... *H04L 67/16* (2013.01); *H04L 41/0213* (2013.01); *H04L 41/12* (2013.01); *H04L 65/1073* (2013.01); *H04L 65/4084* (2013.01); *H04L 67/2842* (2013.01)

(58) Field of Classification Search
CPC .......... G06F 17/30902; H04L 67/2842; H04L 67/2847; H04L 67/2852
USPC ................ 709/206, 207, 213–219, 232–244; 726/12–15, 26, 27; 370/351, 389, 392, 370/395, 396–399; 713/165, 175, 189, 713/193
See application file for complete search history.

(56) References Cited

U.S. PATENT DOCUMENTS

| 5,991,306 | A  | * | 11/1999 | Burns | ............... | G06F 17/30902 370/429 |
| 6,553,376 | B1 | * | 4/2003  | Lewis | ............... | G06F 17/30902 |
| 6,738,384 | B1 | * | 5/2004  | Chung | ............... | H04L 12/40013 370/401 |
| 6,760,756 | B1 | * | 7/2004  | Davis | ............... | G06F 17/30902 707/999.001 |

(Continued)

*Primary Examiner* — David R Lazaro
(74) *Attorney, Agent, or Firm* — Fletcher Yoder, P.C.

(57) ABSTRACT

In the described embodiments, local caching servers (LCSs) are configured to cache content so that the content can be acquired by client electronic devices that are located on local area networks (LANs) with the LCSs. In some embodiments, to enable the acquisition of the cached content, a client electronic device sends, to a registration server, a request for identifiers for LCSs that are located on a LAN with the client electronic device. The request includes one or more "listen ranges," each of which includes an indication of client electronic devices for which a corresponding LCS is to provide content. The registration server uses the listen ranges to select one or more LCSs, and returns identifiers for the one or more LCSs to the client electronic device. Using the one or more identifiers, the client electronic device acquires the content from an LCS via the LAN.

21 Claims, 4 Drawing Sheets (56) References Cited

U.S. PATENT DOCUMENTS

| | | | | |
|---|---|---|---|---|
| 7,359,997 | B2* | 4/2008 | Ishida | G06F 13/385 710/15 |
| 8,571,061 | B2* | 10/2013 | Zilbershtein | H04L 67/2823 370/261 |
| 2005/0210119 | A1* | 9/2005 | Kumar | H04L 12/2805 709/217 |
| 2006/0015555 | A1* | 1/2006 | Douglass | H04L 67/1095 709/203 |
| 2007/0256130 | A1* | 11/2007 | Jung | H04L 63/18 726/24 |
| 2008/0109521 | A1* | 5/2008 | Mousseau | G06Q 10/107 709/206 |
| 2008/0133708 | A1* | 6/2008 | Alvarado | G06Q 10/109 709/218 |
| 2009/0077173 | A1* | 3/2009 | Lowery | H04L 43/0852 709/203 |
| 2011/0219104 | A1* | 9/2011 | Sugawara | G06F 15/173 709/223 |
| 2011/0231475 | A1* | 9/2011 | Van der Merwe | H04L 29/12066 709/203 |
| 2013/0031060 | A1* | 1/2013 | Lowery | G06F 17/30902 707/689 |

* cited by examiner

USING LISTEN RANGES TO DELIVER CONTENT TO ELECTRONIC DEVICES FROM LOCAL CACHING SERVERS

RELATED APPLICATION

This application claims priority under 35 U.S.C. § 119 to U.S. Provisional Application No. 62/005,215, entitled "Using Listen Ranges to Deliver Content to Electronic Devices from Local Caching Servers," by the same inventors, filed 30 May 2014, the contents of which are herein incorporated by reference in their entirety.

BACKGROUND

Field

The described embodiments relate to content delivery for electronic devices. More specifically, the disclosed embodiments relate to using listen ranges to deliver content to electronic devices from local caching servers.

Related Art

Improvements in computing power and wireless networking technology have significantly increased the capabilities of electronic devices. For example, electronic devices such as laptop computers, tablet computers, portable media players, smart phones, etc. are often equipped with personal area network interfaces (Bluetooth, infrared, near-field communications, etc.), local area network interfaces (e.g., WiFi, Ethernet, etc.) and/or wide area network interfaces (cellular voice/data, etc.) that allow the computing devices to retrieve web pages, stream audio and/or video, share desktops and/or user interfaces (UIs), and/or transfer files wirelessly.

The increases in the capabilities of electronic devices have enabled the expansion of numerous usage aspects of the electronic devices. For example, the amount of content delivered to electronic devices via downloading, streaming, or otherwise accessing content over networks (generally, "digital content delivery") has significantly increased in the last few years. Users of electronic devices regularly use the electronic devices to acquire (download, stream, etc.) content such as music, movies, pictures, books, software updates, and/or applications from Internet-based content providers and/or content delivery networks. The increase in digital content delivery, while an improvement in the ease of acquiring content, can cause problems for electronic device users, network hosts, and/or content providers. For example, consider a school (e.g., grades K-12, college, etc.) that would like for students to download digital textbooks. Often, schools have limited Internet bandwidth (e.g., bandwidth caps, etc.). Because digital textbooks are typically incorporated in large files (a gigabyte or more), downloading a digital textbook places an appreciable load on the school's Internet connection. Multiply this effect times hundreds or thousands of electronic devices, and the overall impact on the network access for the school can be prohibitive (can restrict bandwidth for other uses, exceed bandwidth caps, incur fees, etc.). Consequently, delivery of content to large numbers of electronic devices using the same Internet connection may negatively impact the deployment and/or usage of the electronic devices.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

In some embodiments, a computing device (e.g., electronic device 102-104 (see FIG. 1), local caching server (LCS) 106-107, registration server 120, etc. and/or some portion thereof) uses code and/or data stored on a computer-readable storage medium to perform some or all of the operations herein described. More specifically, the computing device reads the code and/or data from the computer-readable storage medium and executes the code and/or uses the data when performing the described operations. A computer-readable storage medium can be any device or medium or combination thereof that stores code and/or data for use by a computing device. For example, the computer-readable storage medium can include, but is not limited to, volatile memory or non-volatile memory, including flash memory, random access memory (RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs). In the described embodiments, the computer-readable storage medium does not include non-statutory computer-readable storage mediums such as transitory signals.

In some embodiments, one or more hardware modules are configured to perform the operations herein described. For example, the hardware modules can comprise, but are not limited to, one or more processors/cores/central processing units (CPUs), application-specific integrated circuit (ASIC) chips, field-programmable gate arrays (FPGAs), caches/cache controllers, compute units, embedded processors, graphics processors (GPUs)/graphics cores, pipelines, and/or other programmable-logic devices. When such hardware modules are activated, the hardware modules perform some or all of the operations. In some embodiments, the hardware modules include one or more general-purpose circuits that are configured by executing instructions (program code, firmware, etc.) to perform the operations. In some embodiments, one or all of the hardware modules is included in a computing device such as electronic devices 102-104, local caching server 106-107, registration server 120, etc.

Content

In the described embodiments, content is acquired (downloaded, retrieved, streamed, etc.) by electronic devices. "Content" as used herein includes digitally-encoded files that comprise, e.g., one or more of audio, video, text, a font, voices (e.g., voice packages used by software in the electronic device), a language dictionary, an image, a book, a software program (i.e., application/app/applet, operating system, firmware, etc.), a software program update, and/or other digitally-encoded information. For example, a digitally-encoded textbook file that includes information such as text, images, interactive matter, outlines, notes, etc. is one form of content. As another example, an application including one or more files with program code and/or data used for executing an application is a form of content. As yet other examples, image files, music files, and video files are forms of content. More generally, content includes any type of file, data, stream, etc. that can be acquired via a network as described herein.

Overview

In the described embodiments, electronic devices that are herein referred to as "local caching servers" are configured to cache (store) local copies of content so that the content can be acquired (e.g., downloaded, streamed, etc.) by client electronic devices that are located on local area networks (LANs) with the local caching servers. In some embodiments, to enable the acquisition of cached content from a local caching server, a client electronic device requests, from a registration server via the Internet, identifiers (e.g., addresses, device IDs, etc.) for local caching servers that are located on a LAN with the client electronic device. The registration server determines one or more local caching servers on the LAN with the client electronic device and returns identifiers for the one or more local caching servers to the client electronic device. Using the one or more identifiers, the client electronic device attempts to acquire the content from a local caching server via the LAN.

The described embodiments use "listen ranges" to determine the local caching servers on the LAN with the client electronic device. Generally, a listen range includes an indication of client electronic devices for which a corresponding local caching server is to provide content. For example, a listen range may include one or more of particular addresses for client electronic devices, identifiers (i.e., addresses) for subnets on which one or more client electronic devices are located, etc. To enable the use of listen ranges, local caching servers provide one or more listen ranges ("server listen ranges") to the registration server (e.g., as part of a registration operation, etc.), each listen range indicating network addresses of client electronic devices for which the corresponding local caching server is to provide content. In addition, client electronic devices can be provided with listen ranges (e.g., in a profile file, etc.) associated with one or more local caching servers that are available to provide content to the client electronic devices. In these embodiments, when a client electronic device requests the identifiers for the local caching servers from the registration server, the client electronic device includes its listen ranges ("client listen ranges") in the request. The registration server then performs one or more operations to determine server listen ranges in which one or more of the client listen ranges is included. From the determined server listen ranges, the registration server determines one or more corresponding local caching servers that are located on the LAN with the client electronic device.

In some embodiments, after determining that multiple different server listen ranges include the client listen ranges, the registration server performs one or more operations to reduce the number of server listen ranges used to determine local caching servers that are located on the LAN with the client electronic device. For example, in some embodiments, the registration server uses one or more filter values (e.g., individual addresses, address ranges, subnet identifiers, etc.) to eliminate some of the server listen ranges. As another example, in some embodiments, the registration server, based on various criteria (random selection, round robin, etc.) simply selects a single one (or two, etc.) of the server listen ranges. As yet another example, in some embodiments, the registration server determines local caching servers associated with each server listen range and uses characteristics (i.e., network interface for, speed of, etc.) for each local caching server to eliminate some of the server listen ranges. By reducing the number of server listen ranges as described, the registration server reduces the number of identifiers for local caching servers returned to the client electronic device.

By acquiring the content from the local caching server via the LAN, the described embodiments can avoid acquiring the content via the Internet (e.g., via an electronic device on the Internet such as a server from a content distribution network). This can help to avoid the above-described impact on Internet access for network hosts, device users, etc. that may be caused by acquiring content via the Internet.

System

Figure 1:
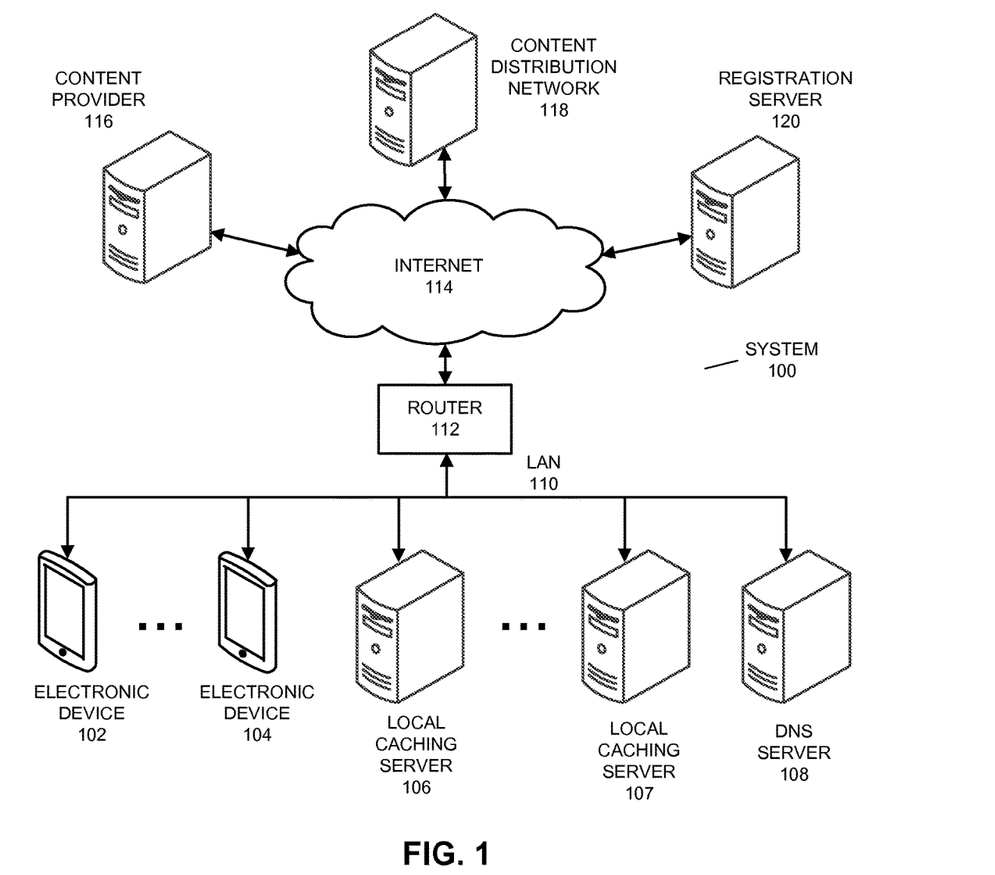
FIG. 1 presents a block diagram illustrating a system in accordance with some embodiments.

FIG. 1 presents a block diagram illustrating a system 100 in accordance with some embodiments. As can be seen in FIG. 1, system 100 includes electronic devices 102-104, local caching servers (LCS) 106-107, domain name system (DNS) server 108, local area network (LAN) 110, router 112, Internet 114, content provider 116, content distribution network (CDN) 118, and registration server 120. Generally, system 100 is configured to enable electronic devices 102-104 to acquire content from local caching servers 106-107 using listen ranges as described herein.

Each of electronic devices 102-104 is an electronic device (referred to as "client electronic device" herein) that is configured to acquire (download, stream, etc.) content from local caching servers via LAN 110, along with performing other operations. Each of electronic devices 102-104 may be, for example, a smart phone (i.e., the embodiment shown in FIG. 1), a desktop computer, a laptop computer, a tablet computer, a network-attached storage device, a media device (set-top box, media player, etc.), a server computer, a television, a wearable computing device, a networking device, and/or another electronic device. In some embodiments, electronic device 102 is a different type of electronic device than electronic device 104.

Local caching servers 106-107 (interchangeably "LCSs") are electronic devices that are configured to store (cache) local copies of content for acquisition via LAN 110 by electronic devices such as electronic devices 102-104, along with performing other operations. Local caching servers 106-107 may be, for example, desktop computers, laptop computers, tablet computers, smart phones, network-attached storage devices, media devices (set-top boxes, media players, etc.), server computers, televisions, wearable computing devices, networking devices, and/or another electronic devices. In some embodiments, local caching server 106 is a different type of electronic device than local caching server 107.

DNS server 108 is an electronic device that is configured to provide network information to devices on LAN 110. For example, in some embodiments, DNS server 108 is configured to translate human-readable names such as "www.website.com" to corresponding internet protocol (IP) addresses. In some embodiments, DNS server 108 is configured to provide listen ranges in response to corresponding requests from client electronic devices. In these embodiments, administrators may use DNS server 108 to provide the listen ranges instead of individually storing/installing profile files on each client electronic device.

LAN 110 is a communication network with signal routes (electrical wires/cables, optical wires/cables, radio waves, etc.) and network devices (routers, switches, access points, etc.) that are used for communicating between devices that are communicatively coupled to LAN 110 (e.g., electronic devices 102-104, local caching servers 106-107, router 112, etc.). For example, LAN 110 may include local-area communication networks such as one or more of wired networks (Ethernet, etc.) and wireless networks (WiFi, Bluetooth, etc.).

Router 112 is an electronic device configured to route network traffic (e.g., messages, packets, etc.) for devices on LAN 110. In some embodiments, router 112 functions as a network address translator (NAT), interfacing between a private address space on LAN 110 and a public address space on Internet 114. In these embodiments, router 112 may update the addresses in packets destined for devices on Internet 114 sent from devices on LAN 110 from the private address of the device on LAN 110 to a public address of router 112, and update the addresses in packets destined for devices on LAN 110 sent from devices on Internet 114 from the public address of router 112 to a private address of the device on LAN 110. However, in some embodiments, one or more devices on LAN 110 has a publicly-routable address and router 112 may pass packets sent to and received from Internet 114 for these devices without altering address information.

Internet 114 (i.e., the Internet) is a communication network with signal routes (electrical wires/cables, optical wires/cables, radio waves, etc.) and network appliances (routers, switches, etc.) that are used for communicating between devices that are communicatively coupled to Internet 114. As described above, Internet 114 uses a set of public addresses (or publicly-routable addresses) to enable devices to communicate with one another.

Content provider 116 includes one or more electronic devices operated by an entity that sells, licenses, or otherwise provides content to be acquired (downloaded, streamed, etc.) using electronic devices. For example, in some embodiments, the entity is one or more of a commercial content provider, a digital media vendor, a software vendor, a software update provider, an electronic textbook sales organization, etc. In some embodiments, content provider 116 comprises one or more server computers, storage arrays, desktop computers, portable computing devices, and/or other electronic devices that are made available for purchasing or otherwise being provided usage rights to content.

CDN 118 includes one or more electronic devices operated by an entity that provides and/or delivers content on behalf of content providers. For example, in some embodiments the entity is a commercial content distribution network that hosts various types of content for content providers. In some embodiments, CDN 118 comprises one or more server computers, storage arrays, desktop computers, portable computing devices, and/or other electronic devices from which content can be downloaded, streamed, accessed, or otherwise acquired.

Registration server 120 includes one or more electronic devices configured to provide various services for devices that register with registration server 120. For example, in some embodiments, registration server 120 provides services associated with assisting client electronic devices in determining local caching servers that are located on LANs with the client electronic devices as described herein. In some embodiments, registration server 120 comprises one or more server computers, storage arrays, desktop computers, portable computing devices, and/or other electronic devices.

Although system 100 is shown with a particular arrangement of devices, in some embodiments, system 100 includes different devices and/or a different arrangement of devices. For example, in some embodiments, system 100 may include more electronic devices, as is shown by the ellipses in FIG. 1 (potentially a large number of electronic devices such as hundreds or thousands of electronic devices on a LAN 110 provided by a school, government entity, etc.). As another example, in some embodiments, system 100 includes a different number of local caching servers on LAN 110 (e.g., one local caching server). As yet another example, in some embodiments, there is no DNS server 108 on LAN 110. Generally, system 100 includes sufficient devices to perform the operations herein described.

Listen Ranges

Figure 2:
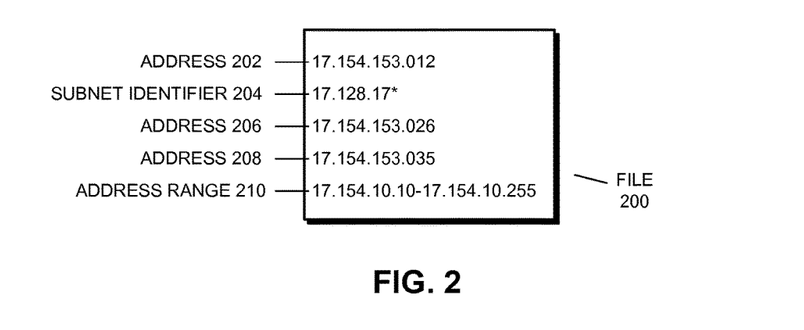
FIG. 2 presents a block diagram illustrating a listen range in accordance with some embodiments.

As described above, some embodiments use listen ranges to determine local caching servers on a LAN with a client electronic device. As also described above, a listen range includes an indication of client electronic devices for which a corresponding local caching server is to provide content. FIG. 2 presents a block diagram illustrating a listen range in accordance with some embodiments. As can be seen in FIG. 2, file 200, which can be a profile file, a configuration file, a text file, and/or any format of file that can be read by registration server 120 and/or other electronic devices, includes a listen range with addresses 202 and 206-208, address range 210, and subnet identifier 204. Addresses 202 and 206 are network addresses (all shown as IPv4 addresses, although some embodiments also use IPv6 addresses) for specific client electronic devices that have publicly routable addresses (i.e., addresses that can be accessed via Internet 114). Addresses 202 and 206 therefore indicate individual client electronic devices for which the corresponding local caching server is configured to provide content via a shared LAN. Address range 210 is a range of network addresses (shown as IPv4 addresses, although some embodiments also use IPv6 addresses) representing all client electronic devices that have publicly routable addresses in the range for which the corresponding local caching server is configured to provide content via a shared LAN. Address 208 is the local caching server's publicly routable address, which is included in file 200 to enable registration server 120 to verify that file 200 can be used to identify the local caching server during a selection operation (as described in more detail below). Subnet identifier 204 is a network address or other identifier for a subnet on which one or more client electronic devices are located. Subnet identifier 204 indicates a subnet for which the corresponding local caching server is configured to provide content via a shared LAN to all client electronic devices.

In some embodiments, the one or more listen ranges for each local caching server are set/configured for the local caching server by a user and/or an administrator, an owner, etc. For example, an administrator for local caching servers 106-107 may enter one or more listen ranges into each local caching server 106-107 that is stored by/in local caching server 106-107 (e.g., in a configuration file by the local caching server), respectively, and used as described herein. Profile files based on the listen ranges for each of local caching servers 106-107 may also be stored by/installed in client electronic devices for which local caching servers 106-107 are configured to provide content (e.g., electronic devices 102-104). In other words, in some embodiments, an administrator creates one or more profile files 200 that include the listen range(s) for each local caching server that is configured to provide content to a given client electronic device and then stores the one or more profile files 200 to the given client electronic device.

In some embodiments, instead of, or in addition to, installing/storing the profile files 200 on each client electronic device, an administrator configures DNS server 108 to provide listen ranges to requesting client electronic devices. Then, at one or more points in time (e.g., at startup, periodically, according to one or more timeout values, etc.), client electronic devices request the listen ranges from DNS server 108 and store the listen ranges (e.g., in profile files 200) for subsequent use. In these embodiments, administering the listen range information may be simplified, as only the DNS server 108 need be updated when a new listen range is to be propagated to client electronic devices.

Registration

In some embodiments, local caching servers perform a registration during which the local caching servers provide registration server 120 with information about the local caching servers. The information provided by the local caching servers, among other things, enables registration server 120 to determine if an identifier for a given local caching server should be returned to client electronic devices in response to queries about local caching servers that can provide cached content to the client electronic devices. In these embodiments, the information can include any information useful for making the determination, including one or more of characteristics of the local caching server (e.g., machine type, network interface, processing power, storage space, uptime, whether the local caching server is set to sleep on idle, etc.), the LAN on which the local caching server is located (e.g., the arrangement of local caching servers on the LAN, etc.). In some embodiments, during the registration process, local caching servers provide one or more server listen ranges to registration server 120, each server listen range indicating client electronic devices for which the corresponding local caching server is available to provide cached content.

Figure 3:
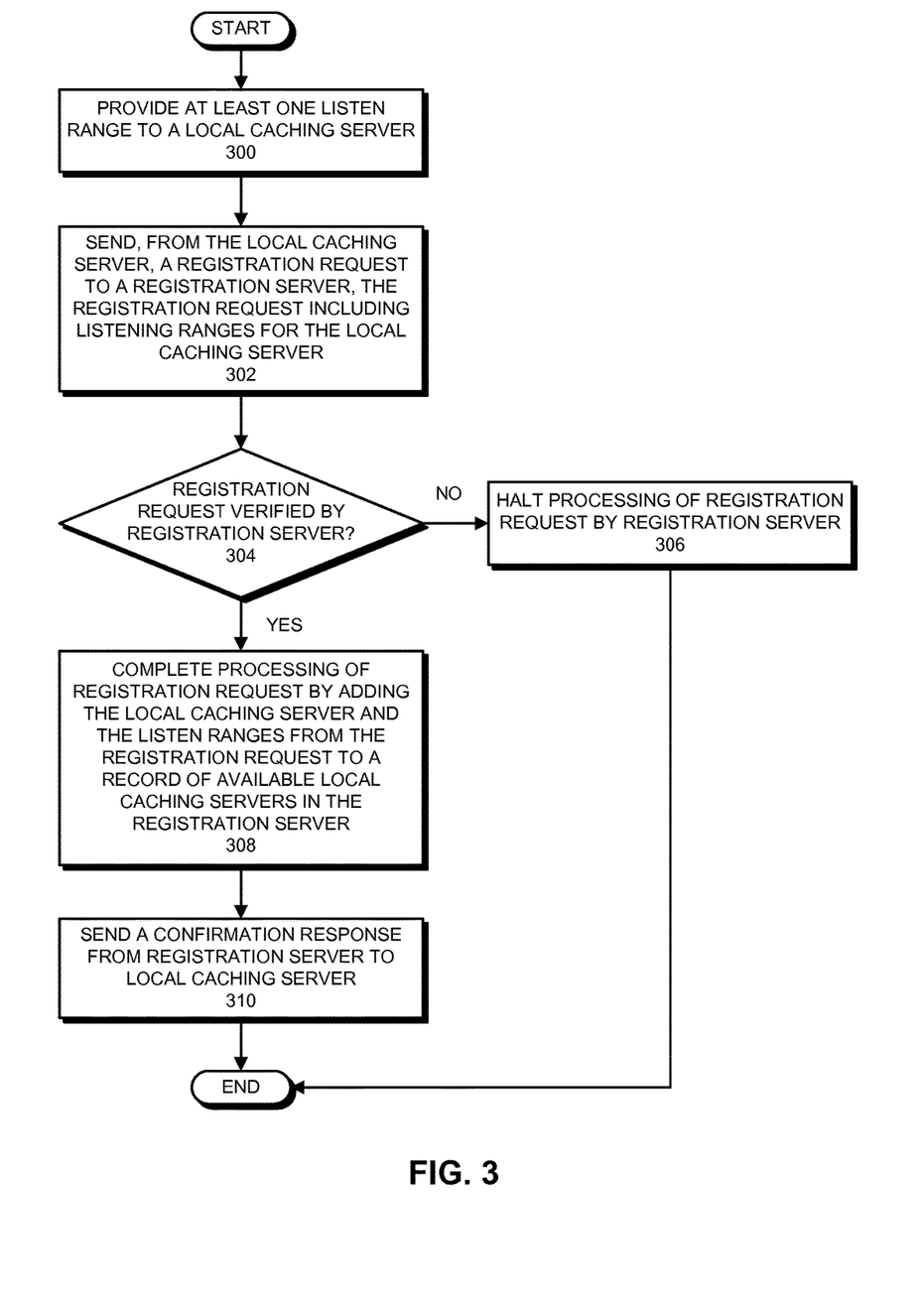
FIG. 3 presents a flowchart illustrating a registration process in accordance with some embodiments.

FIG. 3 presents a flowchart illustrating a registration process in accordance with some embodiments. More specifically, during the registration process shown in FIG. 3, local caching server 106 provides listen ranges to registration server 120. Note that the operations shown in FIG. 3 are presented as a general example of operations performed by some embodiments. The operations performed by other embodiments include different operations and/or operations that are performed in a different order. Additionally, although certain mechanisms are used in describing the operations (e.g., local caching server 106, registration server 120, etc.), in some embodiments, other electronic devices perform the operations. For example, local caching server 107 performs a similar registration operation—so that registration server 120 has listen ranges for local caching server 107. In addition, in some embodiments, information aside from listen ranges is provided to the registration server during the registration process (such information is described above).

The process shown in FIG. 3 starts when at least one listen range is provided to local caching server 106 (step 300). For example, a user (e.g., an administrator) may provide one or more listen ranges to local caching server 106, another system may provide one or more listen ranges, an operating system or application on local caching server 106 may determine (via analysis of devices on LAN 110) and/or provide one or more listen ranges, etc. In some embodiments, this operation includes installing/storing one or more files 200 (e.g., profile files, configuration files, etc.) at a specified location in a memory of local caching server 106 (e.g., in a configuration directory, etc.). For this example, it is assumed that the client electronic devices for which local caching server 106 is available to provide content include electronic devices 102-104. Thus, in some embodiments, at least one listen range in local caching server 106 includes addresses for electronic devices 102-104 and/or a subnet identifier 204, which identifies a subnet on which electronic devices 102-104 are located. In some embodiments, in addition to the particular addresses/subnets for client electronic devices 102-104, each listen range includes an address for local caching server 106, which is used for verification, as described below.

As described above, local caching server 106 may be provided with multiple listen ranges (e.g., may have two or more files 200 stored in the specified location). Each of the listen ranges, which may or may not be mutually exclusive, identifies corresponding client electronic devices. For example, in some embodiments, if local caching server 106 has been communicatively coupled to two or more LANs, local caching server 106 may have a listen range for each LAN (which may list different addresses/subnet identifiers for client electronic devices).

Next, local caching server 106 sends a registration request to registration server 120 (step 302). More specifically, local caching server 106 sends a message to registration server 120 (via LAN 110 and Internet 114) that includes the registration request. In some embodiments, the registration request (i.e., the message in which the registration request is included) comprises each server listen range stored/installed in local caching server 106, local caching server 106's public IP address, and local caching server 106's private IP address, along with the above-described information about local caching server 106. In these embodiments, the public IP address is the IP address used to communicate with local caching server 106 via Internet 114, which can be a publicly-routable IP address assigned to local caching server 106 or, if router 112 functions as a NAT, can be a publicly-routable IP address assigned to router 112. Local caching server 106's private IP address is an IP address assigned to local caching server 106 on LAN 110. Thus, depending on whether (or not) local caching server 106 is assigned a publicly-routable IP address, local caching server 106's public IP address may match its private IP address.

Upon receiving the registration request, registration server 120 verifies the registration request. For example, in some embodiments, registration server 120 verifies the request by determining that the public or private IP address for local caching server 106 from the request is included in one of the server listen ranges from the request. In this way, registration server 120 ensures that local caching server 106 is itself part of the listen range. Registration server 120 may also perform other verification operations (CRC checks, etc.). If the registration request cannot be verified (step 304), registration server 120 halts further processing of the request (step 306) and may optionally send a rejection message to local caching server 106.

When registration server 120 is able to verify the registration request (step 304), registration server 120 adds local caching server 106 and the server listen ranges from the registration request to a record of available local caching servers in registration server 120 (step 308). Generally, the record of available local caching servers includes a listing of registered local caching servers, each of which is associated with corresponding server listen ranges. As described in more detail below, the record is subsequently used (i.e., searched) to find local caching servers that can provide content to client electronic devices.

After adding the local caching server 106 and the server listen ranges from the registration request to a record of available local caching servers, registration server 120 sends a confirmation response to local caching server 106 (step 310). The confirmation response includes, among other information, a confirmation that local caching server 106 was successfully registered with registration server 120 for the server listen ranges included in the registration request.

Although a registration process is described above, in some embodiments, local caching servers and/or other entities on behalf of local caching servers provide and/or update some or all of the above-described information during a different process/operation. For example, a local caching server (e.g., local caching servers 106 and/or 107) may update the information periodically, as portions of the information change, upon request by registration server 120, etc. As another example, in some embodiments, an administrator and/or another electronic device (e.g., content provider 116, etc.) provides and/or updates some or all of the information. Generally, in the described embodiments, registration server 120 is provided and/or acquires sufficient information about local caching servers to perform the operations herein described.

Acquiring Content from Local Caching Servers

Figure 4A:
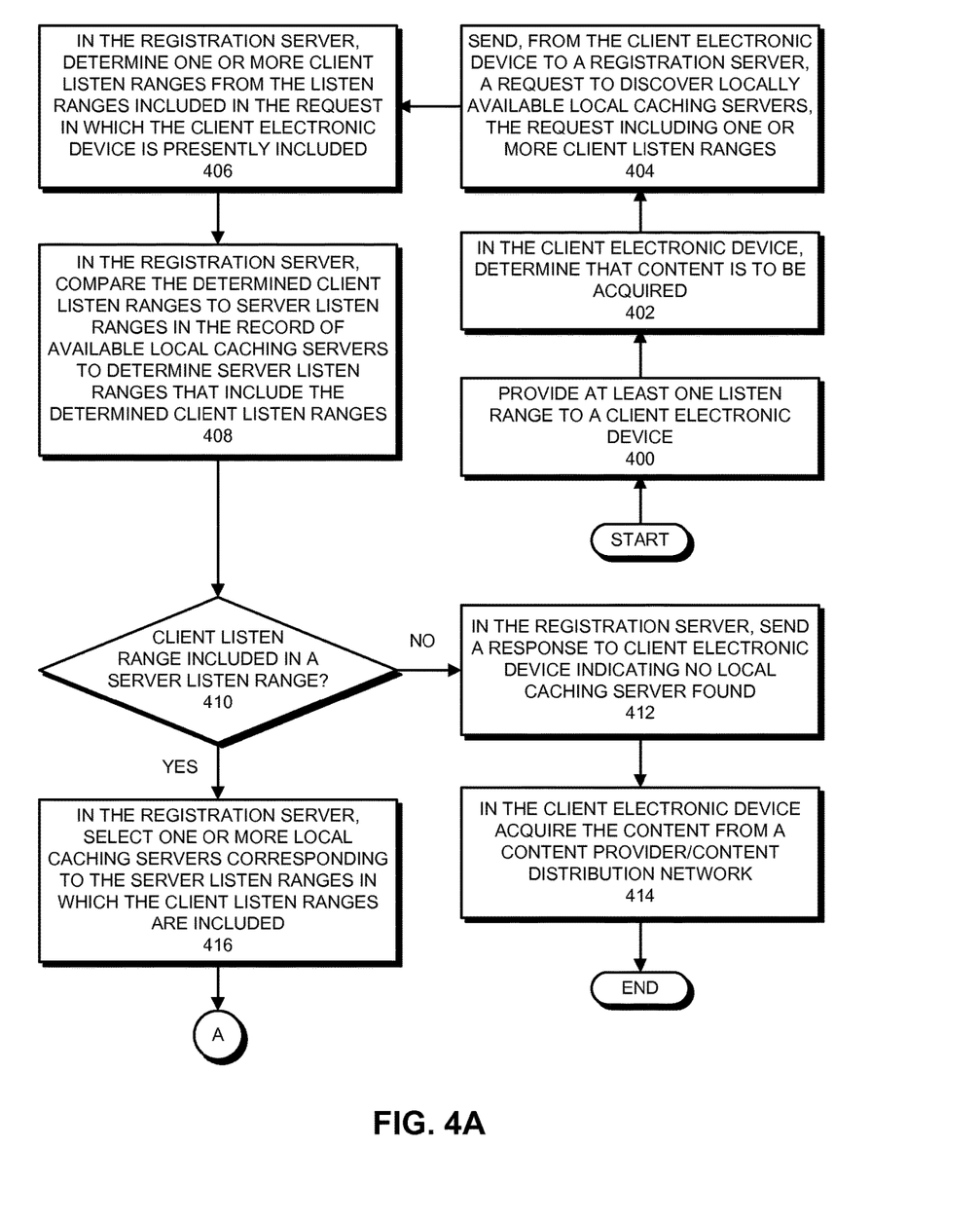
FIGS. 4A-4B present a flowchart illustrating a process for acquiring content from a local caching server in accordance with some embodiments.
Figure 4B:
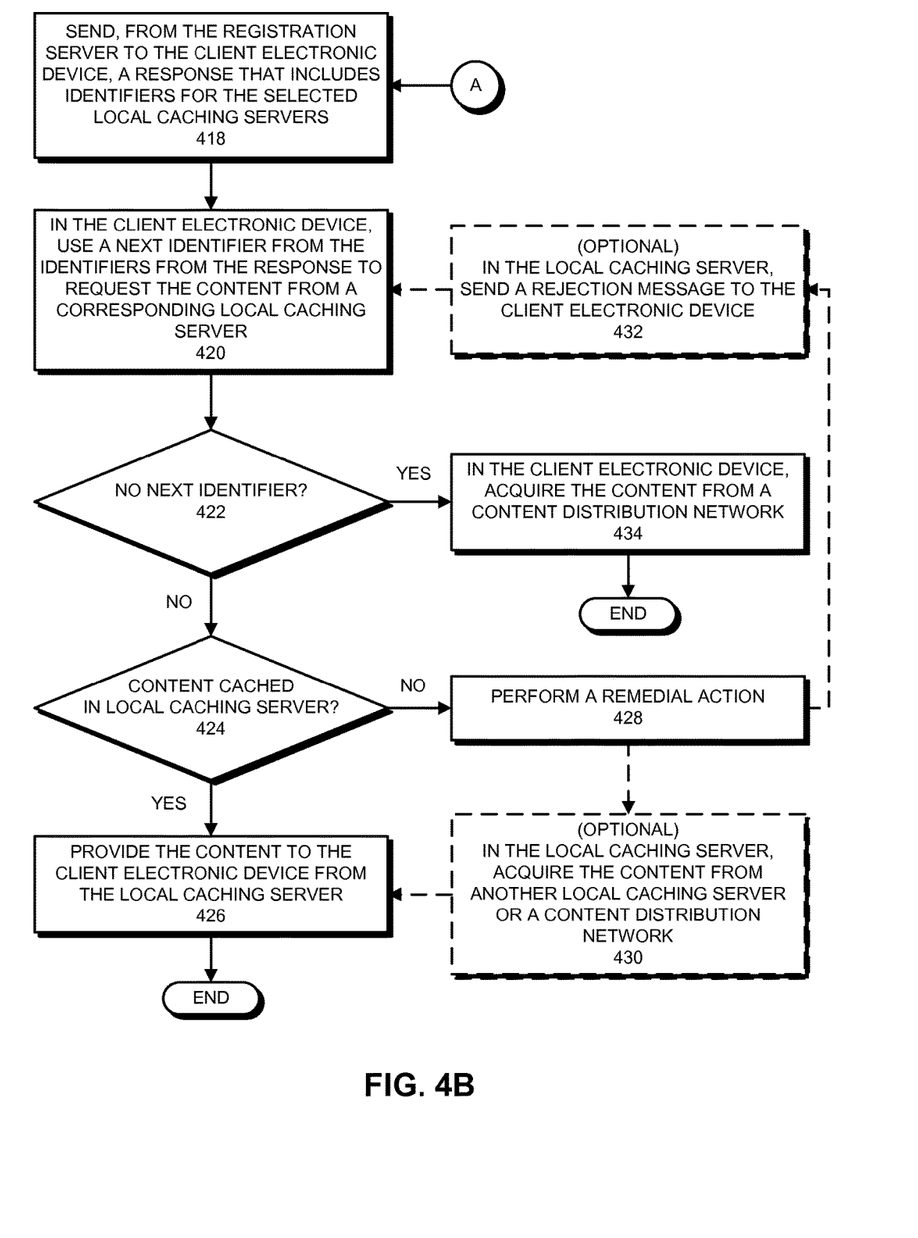

As described above, in the described embodiments, a client electronic device uses listen range(s) to retrieve, from a registration server, identifiers for local caching servers that are located on a LAN with the client electronic device, and then uses the identifiers to attempt to acquire content from the local caching servers on the LAN with the client electronic device. FIG. 4 presents a flowchart illustrating a process for acquiring content from a local caching server in accordance with some embodiments. More specifically, during the process shown in FIG. 4, client electronic device 102 requests identifiers for local caching servers located on LAN 110 from registration server 120. In response, client electronic device 102 receives identifiers for local caching servers 106-107 from registration server 120. Client electronic device 102 then attempts to acquire content from local caching server 106 and/or 107 using the corresponding identifier. Note that the operations shown in FIG. 4 are presented as a general example of operations performed by some embodiments. The operations performed by other embodiments include different operations and/or operations that are performed in a different order. Additionally, although certain mechanisms are used in describing the operations (e.g., client electronic device 102, local caching servers 106-107, registration server 120, etc.), in some embodiments, other electronic devices perform the operations.

The process shown in FIG. 4 starts when at least one listen range is provided to client electronic device 102 (step 400). For example, a user (e.g., an administrator) may provide one or more listen ranges to client electronic device 102, another electronic device may provide one or more listen ranges, an operating system or application on client electronic device 102 may determine (via analysis of devices on LAN 110) and/or provide one or more listen ranges, etc. In some embodiments, this operation includes installing/storing one or more corresponding files 200 (e.g., profile files, configuration files, etc.) at a specified location in a memory of client electronic device 102 (e.g., in a configuration directory, etc.)—as well as in a corresponding location in non-volatile memory. For this example, it is assumed that the listen ranges include a first listen range from local caching server 106 (i.e., a listen range that is included in, and may match, a server listen range for local caching server 106) and a second listen range from local caching server 107. Note that the listen range from each local caching server includes identifiers for client electronic devices for which the local caching server is to provide cached content, as well as an address for the corresponding local caching server. For example, the listen range from local caching server 106 may include an address for client electronic device 102 and/or a subnet identifier 204 that identifies a subnet on which client electronic device 102 is located (perhaps along with addresses for one or more other client electronic devices and/or subnets), as well as the address for local caching server 106.

Note that, in some cases, the above-described listen ranges may be provided to client electronic device 102 separately and/or at different times. For example, client electronic device 102 may communicatively couple with one or more LANs aside from LAN 110 (at work, at school, at home, etc.) and client electronic device 102 may therefore have listen ranges associated with local caching servers available on each LAN. As another example, client electronic device 102 may be separately provided different listen ranges for each of two or more local caching servers (local caching servers 106 and 107) that are or were communicatively coupled to LAN 110. Client electronic device 102 may therefore have listen ranges associated with multiple local caching servers on LAN 110 and/or local caching servers that are not available on LAN 110 (i.e., are on different LANs, are not presently providing cached content to client electronic devices on LAN 110, etc.).

Client electronic device 102 subsequently determines that content is to be acquired (step 402). For example, client electronic device 102 can determine that an electronic textbook is to be downloaded, a video file is to be streamed, a software update is to be installed, and/or another type of content is to be accessed/acquired. In some embodiments, this determination is based on a request from an application, an operating system routine, etc., which may in turn be based on one or more actions of a user (e.g., clicking on a link for the video file in a video player application, etc.).

Note that client electronic device 102 could immediately request the content from content provider 116. In response, content provider 116 would provide a reference (e.g., a universal resource locator or URL, etc.) where the content could be acquired from CDN 118. However, acquiring the content from CDN 118 involves acquiring the content via Internet 114, which, as described above, may not be the most desirable way to acquire the content (due to access caps, fees, etc. from an Internet service provider). Instead, in the described embodiments (and as described for the remainder of FIG. 4), client electronic device 102 first attempts to acquire the content from local caching servers on LAN 110 via LAN 110, which reduces the use of Internet 114 (and may also be faster and more reliable).

After determining that content is to be acquired, client electronic device 102 sends, to registration server 120, a request to discover locally available local caching servers (step 404). More specifically, client electronic device 102 sends a message to registration server 120 (via LAN 110 and Internet 114) that includes the request to discover local caching servers located on LAN 110 (referred to as "locally available"). In some embodiments, the request (or the message in which the request is included) comprises each client listen range stored/installed in client electronic device 102, client electronic device 102's public IP address, and client electronic device 102's private IP address. In these embodiments, the public IP address is the IP address used to communicate with client electronic device 102 via Internet 114, which can be a publicly-routable IP address assigned to client electronic device 102 or, if router 112 functions as a NAT, can be a publicly-routable IP address assigned to router 112. Client electronic device 102's private IP address is an IP address assigned to client electronic device 102 on LAN 110. Thus, depending on whether (or not) client electronic device 102 is assigned a publicly-routable IP address, client electronic device 102's public IP address may match its private IP address.

Upon receiving the request, registration server 120 determines one or more client listen ranges from the listen ranges included in the request in which client electronic device 102 is presently included (step 406). For example, when a client listen range includes addresses, registration server 120 can compare an address for client electronic device 102 (e.g., a public and/or private address) from the request with addresses in the client listen ranges to determine if the address, and hence client electronic device 102, is presently included in the client listen range. As another example, when a client listen range includes a subnet identifier, registration server 120 can compare an address for client electronic device 102 (e.g., a public and/or private address) from the request with the subnet identifier to determine if the address, and hence client electronic device 102, is presently included in the client listen range. Note that client electronic device 102 may not be included in a client listen range, for example, when the client listen range is from a local caching server on a different LAN (because client electronic device 102 is likely to have a different public/private address and therefore not be present in the listen range for the local caching server), etc. For this example, it is assumed that client electronic device 102 is included in two client listen ranges, one client listen range from each of local caching servers 106 and 107.

Registration server 120 then compares the determined client listen ranges to server listen ranges in the record of available local caching servers in registration server 120 to determine server listen ranges that include the determined client listen ranges (step 408). In some embodiments, this includes comparing each of the addresses/subnet identifiers in the determined client listen ranges with each of the addresses/subnet identifiers the server listen ranges in the record. In some embodiments, one or more values (e.g., hash values and/or other representations) may be (or may have been) computed for the client listen ranges and the server listen ranges in the record, and these values may be compared to determine if the client listen range is included in the server listen range. Generally, in these embodiments, a server listen range "includes" a client listen range when the server listen range includes at least the addresses/subnet identifiers from the client listen range (the server listen range may also include other addresses/subnet identifiers). In some cases, this means that the server listen range matches, i.e., includes identical addresses/subnet identifiers to, the client listen range.

As described above, it is assumed that the client listen ranges include client listen ranges associated with local caching servers 106 and 107. Therefore, the above-described comparison discovers two server listen ranges in the record in which corresponding client listen ranges are included (as local caching servers 106-107 both registered as described with respect to FIG. 3). However, if none of the client listen ranges was included in a server listen range (step 410), registration server 120 would send a response to client electronic device 102 indicating that no local caching server was found (step 412). In some embodiments, upon receiving a response indicating that no local caching server was found, client electronic device 102 acquires the content from content provider 116/CDN 118 (step 414). More specifically, client electronic device 102 requests the content from content provider 116. In response, content provider 116 provides a reference (e.g., a universal resource locator or URL, etc.) where the content can be acquired from CDN 118 and client electronic device uses the reference to acquire the content. As described above, this operation includes acquiring the content via Internet 114.

Because at least two client listen ranges are included in server listen ranges (step 410), registration server 120 selects both of local caching servers 106-107 (i.e., selects the local caching servers corresponding to server listen ranges in which one or more of the client listen ranges is included) (step 416). For the example in FIG. 4, two local caching servers (local caching servers 106-107) are located on LAN 110 with client electronic device 102 and both are selected. However, described below, the selecting operation in step 416 may include filtering determined server listen ranges or otherwise choosing a particular number of server listen ranges before selecting local caching server(s) corresponding to the server listen ranges, which means that, in some embodiments, only one of local caching servers 106-107 is selected.

Registration server 120 then sends a response to client electronic device 102 that includes identifiers for the selected local caching servers 106-107 (step 418). Generally, each identifier includes information configured to enable client electronic device 102 to locate/communicate with the corresponding local caching server in order to attempt to acquire the content from the local caching server (and perhaps perform other operations). For example, the identifier may include an address (public or private IP address, etc.) for the corresponding local caching server, a device identifier, authentication information (an access password, a public key, etc.), and/or other information that can be used for locate/communicate with the corresponding local caching server.

Client electronic device 102 then uses a next identifier from the identifiers from the response from registration server 120 to request the content from the corresponding local caching server (step 420). For example, client electronic device 102 may select a next identifier (and thus select a corresponding local caching server) randomly, in a specified order such as round robin (with one or more prior acquisitions of content with local caching server 106-107), in accordance with one or more criteria (e.g., availability of the local caching servers, processing power of the local caching servers, configuration files/rules in client electronic device 102, signals received from local caching server 106 and/or 107, etc.). For this example, it is assumed that client electronic device 102 first selects the identifier corresponding to local caching server 106. Generally, the request sent from client electronic device 102 includes an identification of the content and a request to acquire (download, stream, etc.) the content from the local caching server 106 (i.e., the local caching server corresponding to the next identifier). Note that, because no identifiers have been used to request content before step 420 is performed (for the first time), there is an identifier from which to request content (step 422).

When the content is cached in local caching server 106 (step 424), local caching server 106 provides the content to client electronic device 102 (step 426). More specifically, in a manner that depends on how the content is acquired (download, stream, etc.), local caching server 106 begins to transmit the content to client electronic device 102 via LAN 110. In this case, at some prior point in time, local caching server 106 downloaded the content from CDN 118 (possibly using the process described above for acquiring content from CDN 118) and/or from another source (e.g., from another local caching server, etc.) and stored/cached the content so that the content would be available to provide to client electronic devices.

Note that, in some embodiments, the caching and providing of content are subject to various restrictions, conditions, controls, etc. For example, there may be restrictions, controls, conditions, etc. on where local caching server can cache certain items of content (e.g., what country/region, etc.), how much content will be cached (in terms of bytes, number of files, etc.), and how long the content can be cached before local caching server 106 deletes existing cached content and/or does not cache the content. For example, local caching server 106 may delete content older than a specified age, may delete content that has not been acquired by a client electronic device in a specified amount of time, and/or may mark some content as to be retained (i.e., to be preferably deleted after content that is not so marked). As another example, some content items such as movies, software applications/updates, etc. may only be cached if the local caching server is in a specified country/region. In addition, local caching server 106 may be limited in the client electronic devices to which local caching server 106 is permitted to provide content, such as client electronic devices with credentials that meet certain conditions. In this case, for example, client electronic device 102 may need to belong to, be associated with, and/or be controlled by a device with matching credentials such as when a local caching server provided by a school provides contents to client electronic devices for students, but not other client electronic devices.

When the content is not cached in local caching server 106, local caching server 106 performs a remedial action (step 428). The nature of the remedial action depends on the embodiment. For example, in some embodiments, local caching server 106 immediately attempts to acquire the content from other available local caching servers (e.g., using a similar process to the process described herein) and then, if the content cannot be acquired from other local caching servers, requests the content from content provider 116. In response, content provider 116 provides a reference (e.g., a universal resource locator or URL, etc.) where the content can be acquired from CDN 118 (step 430). Local caching server 106 then begins to download the content, cache the content, and provide the content as the content becomes available (step 426) (perhaps also performing operations to ensure the correctness of downloaded content as the content is downloaded and/or provided). As another example, in some embodiments, local caching server 106 returns a rejection message to client electronic device 102 (step 432). In these embodiments, upon receiving such a rejection message, client electronic device 102 returns to step 420 to use a next identifier (i.e., a newly selected next identifier) to attempt to acquire the content from another local caching server (e.g., local caching server 107). If there are no more identifiers for local caching servers from which to attempt to acquire the content (step 422), in some embodiments, client electronic device 102 requests the content from content provider 116. In response, content provider 116 provides a reference (e.g., a universal resource locator or URL, etc.) where the content can be acquired from CDN 118. Client electronic device 102 then uses the reference to acquire the content from CDN 118 (step 434).

Selecting Available Local Caching Servers

As described above, in some embodiments, the selecting operation in step 416 includes filtering determined server listen ranges and/or choosing a particular number of server listen ranges before selecting local caching server(s) corresponding to the server listen ranges. In some embodiments, the described "filtering" includes removing from consideration corresponding server listen ranges. For example, in some embodiments, local caching servers may have subnet identifiers in their listen ranges, but registration server, based on one or more criteria (e.g., client public/private address) may determine that a given portion of the server listen range does not apply because an administrator or other entity (local caching server, etc.) has indicated that the corresponding local caching server is not to provide content when the criteria applies (e.g., when the client electronic device's public/private address is a specified address or in a set of specified addresses). This can, for example, enable entities (schools, employers, etc.) with multiple local caching servers to assist registration server 120 in selecting one or more desirable local caching servers (or not selecting undesirable local caching servers) for certain client electronic devices. In some embodiments, the criteria includes a listen range or a portion thereof (i.e., a subnet or a portion thereof, a set of addresses, etc.).

In some embodiments, the filtering further includes removing server listen ranges from consideration when the corresponding local caching server does not meet criteria for characteristics associated with the local caching server (e.g., machine type, network interface, processing speed, etc.) and/or does not fit the criteria as well as another available local caching server.

In some embodiments, the above-described "choosing" includes picking a given number of server listen ranges (one, two, etc.) in accordance with a predetermined pattern—a randomly, every other server listen range, a first server listen range, in a round-robin pattern with earlier-chosen listen ranges, etc. In some embodiments, the choosing can be performed to limit the number of identifiers for local caching servers that are eventually returned to a client electronic device. This can help to avoid the client electronic device performing (or repeatedly performing) some of the operations shown in FIG. 4A-4B.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    by a registration server, performing operations for:
    receiving, from a client electronic device, a request to discover local caching servers local to the client electronic device, the request including a client network address for the client electronic device and one or more client listen ranges, wherein each of the one or more client listen ranges comprises one or more network addresses;
    based on the client network address, determining at least one client listen range from the one or more the client listen ranges;
    based on the at least one client listen range, determining at least one server listen range from one or more server listen ranges registered with the registration server, wherein each of the one or more server listen ranges comprises one or more network addresses;

determining one or more local caching servers corresponding to the at least one server listen range; and sending, to the client electronic device, a response that includes identifiers for the one or more local caching servers, the identifiers configured to be usable by the client electronic device to acquire the content from the one or more local caching servers.

2. The method of claim 1, wherein, based on the one or more server listen ranges, selecting the one or more local caching servers comprises: by the registration server, performing operations for:

acquiring, from the request to discover local caching servers local to the client electronic device, at least one client network address for the client electronic device and one or more client listen ranges, wherein each client listen range comprises one or more client network addresses;

based on the at least one client network address, determining client listen ranges in which the client electronic device is presently included;

comparing the determined client listen ranges to the one or more server listen ranges to identify server listen ranges that include the determined client listen ranges; and selecting local caching servers corresponding to the identified server listen ranges.

3. The method of claim 2, further comprising: by the registration server, performing operations for:

using one or more filter values, filtering the identified server listen ranges to remove corresponding identified server listen ranges;

wherein selecting local caching servers corresponding to the identified server listen ranges comprises not selecting local caching servers corresponding to the removed identified server listen ranges.

4. The method of claim 2, further comprising: by the registration server, performing operations for:

when there are two or more identified server listen ranges, based on one or more criteria, choosing a single one of the two or more identified server listen ranges;

wherein selecting local caching servers corresponding to the identified server listen ranges comprises selecting a single local caching server corresponding to the chosen single one of the two or more identified server listen ranges.

5. The method of claim 2, further comprising: by the registration server, performing operations for:

selecting one or more of the identified server listen ranges for which corresponding local caching servers have one or more characteristics with specified relationships to corresponding characteristic values;

wherein selecting local caching servers corresponding to the identified server listen ranges comprises selecting local caching servers corresponding to the selected identified server listen ranges.

6. The method of claim 1, further comprising:

by the registration server, performing operations for:

from each of the one or more local caching servers, receiving an identification of one or more server listen ranges for the local caching server.

7. The method of claim 1, wherein the one or more local caching servers are located on a same local area network (LAN) as the client electronic device.

8. A system comprising:

one or more processors; and a non-transitory computer-readable medium including one or more sequences of instructions which, when executed by one or more processors, cause:

receiving, by a registration server, from a client electronic device, a request to discover local caching servers local to the client electronic device, the request including a client network address for the client electronic device and one or more client listen ranges, wherein each of the one or more client listen ranges comprises one or more network addresses;

based on the client network address, determining, by a registration server, at least one client listen range from the one or more the client listen ranges;

based on the at least one client listen range, determining, by a registration server, at least one server listen range from one or more server listen ranges registered with the registration server, wherein each of the one or more server listen ranges comprises one or more network addresses;

determining, by a registration server, one or more local caching servers corresponding to the at least one server listen range; and sending, by a registration server, to the client electronic device, a response that includes identifiers for the one or more local caching servers, the identifiers configured to be usable by the client electronic device to acquire the content from the one or more local caching servers.

9. The system of claim 8, wherein, based on the one or more server listen ranges, selecting the one or more local caching servers comprises: by the registration server, performing operations for:

acquiring, from the request to discover local caching servers local to the client electronic device, at least one client network address for the client electronic device and one or more client listen ranges, wherein each client listen range comprises one or more client network addresses;

based on the at least one client network address, determining client listen ranges in which the client electronic device is presently included;

comparing the determined client listen ranges to the one or more server listen ranges to identify server listen ranges that include the determined client listen ranges; and selecting local caching servers corresponding to the identified server listen ranges.

10. The system of claim 9, further comprising: by the registration server, performing operations for:

using one or more filter values, filtering the identified server listen ranges to remove corresponding identified server listen ranges;

wherein selecting local caching servers corresponding to the identified server listen ranges comprises not selecting local caching servers corresponding to the removed identified server listen ranges.

11. The system of claim 9, further comprising: by the registration server, performing operations for:

when there are two or more identified server listen ranges, based on one or more criteria, choosing a single one of the two or more identified server listen ranges;

wherein selecting local caching servers corresponding to the identified server listen ranges comprises selecting a single local caching server corresponding to the chosen single one of the two or more identified server listen ranges.

12. The system of claim 9, further comprising: by the registration server, performing operations for:
    selecting one or more of the identified server listen ranges for which corresponding local caching servers have one or more characteristics with specified relationships to corresponding characteristic values;
    wherein selecting local caching servers corresponding to the identified server listen ranges comprises selecting local caching servers corresponding to the selected identified server listen ranges.

13. The system of claim 8, further comprising:
    by the registration server, performing operations for:
    from each of the one or more local caching servers, receiving an identification of one or more server listen ranges for the local caching server.

14. The system of claim 8, wherein the one or more local caching servers are located on a same local area network (LAN) as the client electronic device.

15. A non-transitory computer-readable medium including one or more sequences of instructions which, when executed by one or more processors, cause:
    a registration server, to perform operations for:
    receiving, from a client electronic device, a request to discover local caching servers local to the client electronic device, the request including a client network address for the client electronic device and one or more client listen ranges, wherein each of the one or more client listen ranges comprises one or more network addresses;
    based on the client network address, determining at least one client listen range from the one or more the client listen ranges;
    based on the at least one client listen range, determining at least one server listen range from one or more server listen ranges registered with the registration server, wherein each of the one or more server listen ranges comprises one or more network addresses;
    determining one or more local caching servers corresponding to the at least one server listen range; and
    sending, to the client electronic device, a response that includes identifiers for the one or more local caching servers, the identifiers configured to be usable by the client electronic device to acquire the content from the one or more local caching servers.

16. The non-transitory computer-readable medium of claim 15, wherein, based on the one or more server listen ranges, selecting the one or more local caching servers comprises: by the registration server, performing operations for:
    acquiring, from the request to discover local caching servers local to the client electronic device, at least one client network address for the client electronic device and one or more client listen ranges, wherein each client listen range comprises one or more client network addresses;
    based on the at least one client network address, determining client listen ranges in which the client electronic device is presently included;
    comparing the determined client listen ranges to the one or more server listen ranges to identify server listen ranges that include the determined client listen ranges; and
    selecting local caching servers corresponding to the identified server listen ranges.

17. The non-transitory computer-readable medium of claim 16, wherein the instructions cause: by the registration server, performing operations for:
    using one or more filter values, filtering the identified server listen ranges to remove corresponding identified server listen ranges;
    wherein selecting local caching servers corresponding to the identified server listen ranges comprises not selecting local caching servers corresponding to the removed identified server listen ranges.

18. The non-transitory computer-readable medium of claim 16, wherein the instructions cause: by the registration server, performing operations for:
    when there are two or more identified server listen ranges, based on one or more criteria, choosing a single one of the two or more identified server listen ranges;
    wherein selecting local caching servers corresponding to the identified server listen ranges comprises selecting a single local caching server corresponding to the chosen single one of the two or more identified server listen ranges.

19. The non-transitory computer-readable medium of claim 16, wherein the instructions cause: by the registration server, performing operations for:
    selecting one or more of the identified server listen ranges for which corresponding local caching servers have one or more characteristics with specified relationships to corresponding characteristic values;
    wherein selecting local caching servers corresponding to the identified server listen ranges comprises selecting local caching servers corresponding to the selected identified server listen ranges.

20. The non-transitory computer-readable medium of claim 15, wherein the instructions cause:
    by the registration server, performing operations for:
    from each of the one or more local caching servers, receiving an identification of one or more server listen ranges for the local caching server.

21. The non-transitory computer-readable medium of claim 15, wherein the one or more local caching servers are located on a same local area network (LAN) as the client electronic device.

\* \* \* \* \*